United States Patent [19]

Benzler et al.

[11] Patent Number: 5,120,337
[45] Date of Patent: Jun. 9, 1992

[54] INTAKE AIR FILTER FOR THE INTERNAL COMBUSTION ENGINE OF A MOTOR VEHICLE

[75] Inventors: Heinz Benzler, Kirchberg/Murr; Volker Ernst, Sachsenheim; Arthur Klotz, Remseck, all of Fed. Rep. of Germany

[73] Assignee: Filterwerk Mann & Hummel GmbH, Ludwigsburg, Fed. Rep. of Germany

[21] Appl. No.: 740,574

[22] Filed: Aug. 6, 1991

[30] Foreign Application Priority Data

Aug. 6, 1990 [DE] Fed. Rep. of Germany ... 9011419[U]

[51] Int. Cl.⁵ .............................................. B01D 46/00
[52] U.S. Cl. ........................................ 55/482; 55/498; 55/502
[58] Field of Search ............... 55/482, 337, 486, 502, 55/498

[56] References Cited

U.S. PATENT DOCUMENTS

| 3,672,130 | 6/1972 | Sullivan | 55/498 |
| 4,020,783 | 5/1977 | Anderson et al. | 116/114 |
| 4,278,455 | 7/1981 | Nardi | 55/337 |

FOREIGN PATENT DOCUMENTS

| 7321762 | 3/1974 | Fed. Rep. of Germany . |
| 2626008 | 12/1976 | Fed. Rep. of Germany . |
| 727975 | 6/1932 | France . |

*Primary Examiner*—Bernard Nozick
*Attorney, Agent, or Firm*—Foley & Lardner

[57] ABSTRACT

An intake air filter for an internal combustion engine is disclosed which includes a housing having a raw air inlet for unfiltered air and a clean air outlet for filtered air and first and second annular filter inserts disposed concentrically one inside the other within the housing through which air flows radially from the outside to the inside, the first filter insert being an outer filter insert, and the second filter insert being a safety cartridge disposed within the first filter insert, the second filter insert being closed at one end with a cover plate; the other end of the second filter insert facing the air outlet, and the second filter insert being secured to the housing by a screw thread adjacent the air outlet.

6 Claims, 2 Drawing Sheets

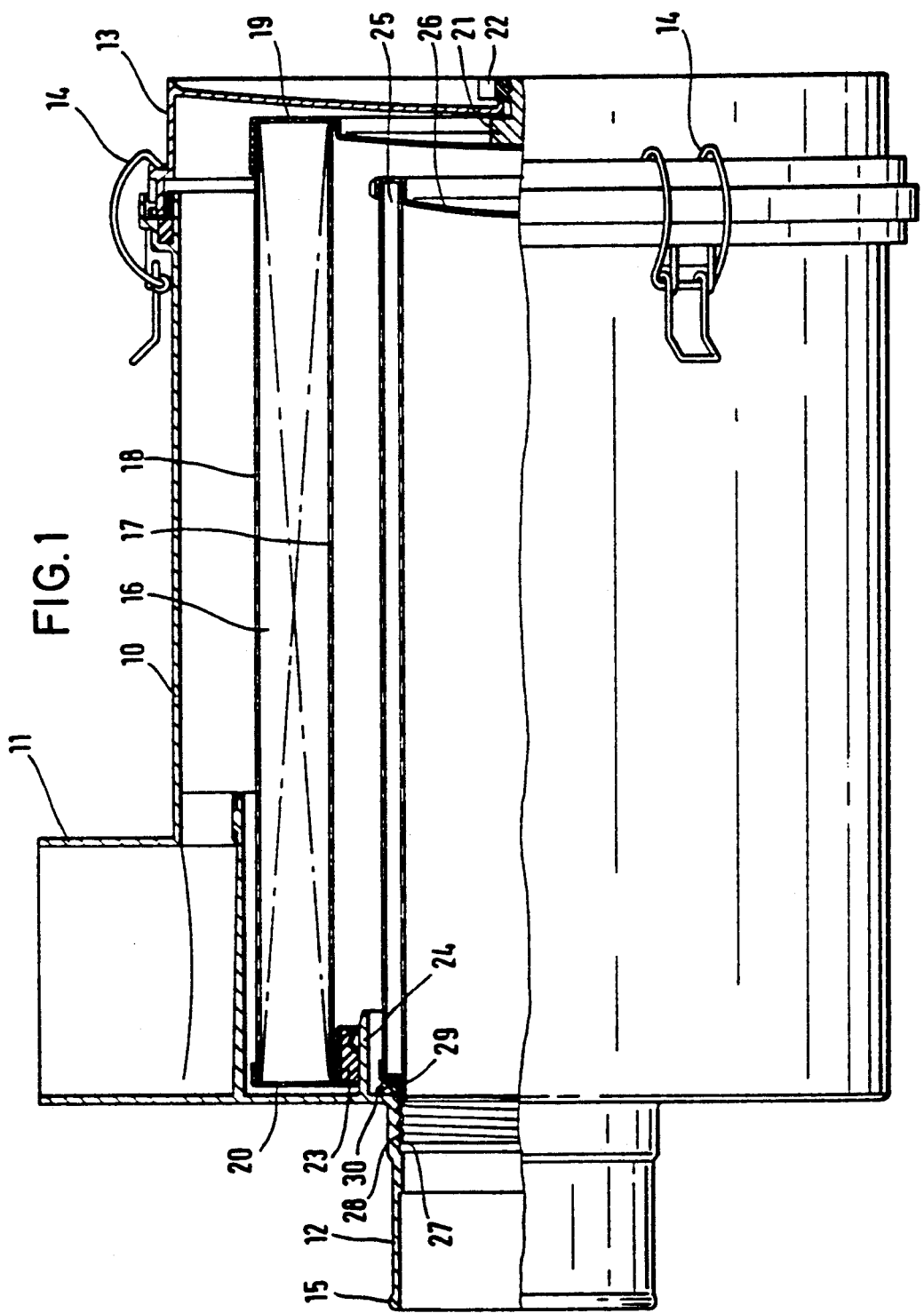

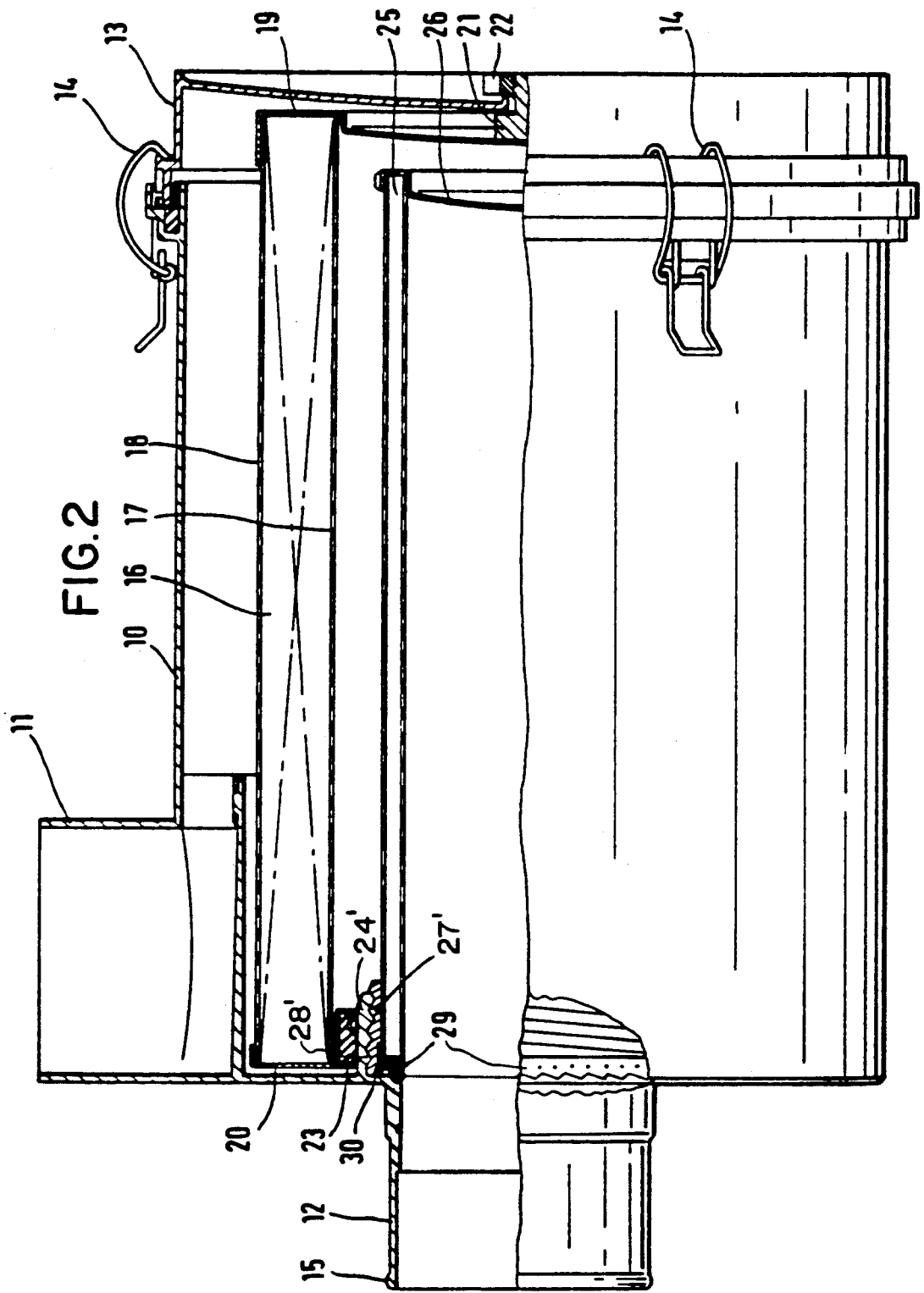

INTAKE AIR FILTER FOR THE INTERNAL COMBUSTION ENGINE OF A MOTOR VEHICLE

BACKGROUND OF THE INVENTION

This invention relates to an intake air filter for the internal combustion engine of a motor vehicle which comprises a housing with a raw air inlet for unfiltered air and a clean air outlet for filtered air and two annular filter inserts disposed concentrically one inside the other inside the housing through which air from the raw air inlet flows radially to the clean air outlet.

German Utility Model No. DE-G 73-21,762 discloses an intake air filter for internal combustion engines, compressors and other air-aspirating machines, which comprises two filter inserts disposed concentrically one inside the other. The filter inserts are fastened by a central threaded bolt anchored in the clean air intake. The bolt extends through openings in the cover plates and clamps the filter inserts axially against the housing parts by means of nuts. Abutments are provided on the bolt to hold the filter inserts in proper position, and the cover plates rest on the abutments.

This type of fastening arrangement requires a very high accuracy in the position of the abutment surfaces on which the filter inserts are supported in the housing. Furthermore, similar high accuracy in the length of the filter inserts also is required in order to assure reliable sealing of the end face of the filter insert that lies adjacent the clean air intake. In filter units which must be replaced frequently, this requirement for high accuracy leads to unreasonably high costs.

Another disadvantage of the threaded bolt arrangement is that the bolt must be fastened inside the clean air intake. This may be possible, for example, by spot welding if the housing is made of sheet metal. If the housing is made of plastic and the clean air intake is integrated into the housing, a bolt can only be fastened to the housing at the high cost of providing reinforcing ribs, metal inserts, etc. Even if a rather expensive construction is used, there is a danger that the creep of the plastic over a long period of time will lead to a decrease in the holding forces acting on the filter insert, so that the seal between the raw air chamber and the clean air chamber within the filter is threatened by loosening of the filter insert.

SUMMARY OF THE INVENTION

It is therefore the object of the invention to provide an air filter in which filter inserts can be fastened in a simple an reliable manner.

It is also an object of the invention to provide an air filter with a filter housing which can particularly suitably be made of plastic.

A further object of the invention is to provide an air filter which overcomes the aforementioned disadvantages of the prior art.

These and other objects of the invention are achieved by providing a

A significant advantage of the invention is the simple construction of the housing, which requires only a screw thread on the housing wall. Also, the filter insert does not require any additional structural elements. The thread on the filter insert can be provided, for example, on an appropriately designed cover or end plate. It is also unnecessary to maintain a high degree of accuracy with respect to the length of the filter insert since the sealing surface can be arranged in the immediate vicinity of the location where the filter insert is attached.

According to a further embodiment of the invention, a screw thread is arranged in the tubular connection which constitutes the clean-air outlet of the filter housing. A short threaded flange is provided on the filter insert for attaching the second filter insert or safety cartridge. The thread is advantageously constructed in the form of a half-round thread. This facilitates screwing the safety cartridge in place and is especially suitable for use on a plastic part.

In an alternative embodiment, a projection is provided on the housing which extends into the interior of the housing and carries the screw thread. In this case the mating thread is disposed on the outer circumference of the safety cartridge in the vicinity of the end face of the cartridge. If the housing has a tubular projection of this kind, then it can advantageously also be used as a radial seal for the first filter insert.

In accordance with another advantageous embodiment of the invention, a gasket for sealing the safety cartridge is arranged at the front end of the cartridge. This gasket or seal is constructed as an axial gasket and advantageously includes a sealing lip which can bridge large axial spacings which may result, for example, from differing degrees of tightening of the filter.

According to a further advantageous embodiment of the invention, the screw joint is combined with a locking means in order to prevent the safety cartridge from being unscrewed by severe shaking or vibration. For this purpose the gasket of the cartridge is provided with serrations extending along the sealing surface. The housing is also provided in like manner with such serrations. When the cartridge is screwed into the housing, the serrated teeth of the gasket will catch in the corresponding indentations in the housing.

The shape of the teeth permits the cartridge to be screwed in easily, but any unscrewing of the cartridge due to shaking or vibration is effectively prevented. It is nevertheless possible, however, to replace the cartridge since the serrated gasket is soft and, when a sufficient torque is applied to the safety cartridge, the teeth of the gasket slip out of the corresponding indentations in the housing.

The unscrewing torque is determined by the shape of the serrations. An appropriate form for the serrations can be selected depending on the type of vibrations to be encountered and on the permissible unscrewing torque.

BRIEF DESCRIPTION OF PREFERRED EMBODIMENTS

The invention will be explained in further detail hereinafter with reference to a preferred embodiment illustrated in the accompanying drawings in which FIG. 1 is a sectional view of an intake air filter of the invention and FIG. 2 i s a sectional view of an alternate air filter embodiment according to the invention.

DETAILED DESCRIPTION OF PREFERRED EMBODIMENTS

The intake air filter shown in FIG. 1 comprises a housing 10 which has a raw-air inlet 11 and a clean-air outlet 12. The housing is closed at its end remote from the clean-air outlet by a housing cover 13. A plurality of latches 14 are distributed around the circumference to securely fasten the cover to the housing. The clean-air outlet 12 of the housing is an outwardly extending tubular connection which is provided with an annular bead 15 for attaching a flexible air hose or the like.

A filter insert 16 is constructed in a known manner of pleated filter paper arranged between an inner supporting sleeve 17 and an outer supporting sleeve 18. The ends of the filter insert 16 are closed by end plates 19 and 20. End plate 19 is provided in its center with a threaded insert 21, by means of which the filter insert 16 is fastened to the housing cover 13 with a wing nut 22.

At its opposite end filter insert 16 is provided with an end plate 20 carrying a radial gasket 23. This radial gasket 23 abuts an inwardly extending collar 24 of the housing 10.

Within the filter insert 16 is an additional filter insert 25. This is a so-called "safety cartridge," which serves to effectively prevent dirt from entering the clean-air side of the filter when the filter insert 16 is being replaced, or even when the filter insert 16 is missing. This safety cartridge 25 is closed at its rearward end by an end plate 26.

At its end adjacent the clean-air outlet 12 the safety cartridge 25 is provided with a tubular flange having an external thread 27. The safety cartridge is secured by means of this thread to the housing 10, which at this point bears a mating internal thread 28. Thread 28 advantageously is in the form of a half-round thread, which is easy to produce, particularly in a plastic housing. A gasket 29 is provided on the safety cartridge in order to seal the cartridge axially. This gasket abuts against the sealing area 30 of the housing 10. As can be seen in FIG. 2, gasket 29 is provided with serrations for securing the additional filter insert 25 to the housing 10.

The tubular connection on filter insert 25 which carries the thread 27 can be formed as part of the end plate of the filter insert. Therefore no additional structural components are needed as fastening means for safety cartridge.

FIG. 2 shows an alternate embodiment in which a tubular connection or collar 24' which carries a first screw thread 28' is arranged on housing 10 concentric with filter insert 16 and extending into the interior of housing 10. A second screw thread 27' arranged on additional filter insert 25 matingly engages the first screw thread 28' to secure the additional filter insert to the housing.

The foregoing description and examples have been set forth merely to illustrate the invention and are not intended to be limiting. Since modifications of the described embodiments incorporating the spirit and substance of the invention may occur to persons skilled in the art, the invention should be construed to include all variations falling within the scope of the appended claims and equivalents thereof.

What is claimed is:

1. An intake air filter for an internal combustion engine, comprising a housing having a raw air inlet for unfiltered air and a clean air outlet for filtered air and first and second annular filter inserts disposed concentrically one inside the other within said housing through which air flows radially from the outside to the inside, said first filter insert being an outer filter insert, and said second filter insert being a safety cartridge disposed within said first filter insert, a cover plate for closing one end of said second filter insert, wherein the other end of said second filter insert faces said air outlet and is secured to said housing adjacent said air outlet by means of a screw thread.

2. An intake air filter according to claim 1, wherein said second filter insert comprises a tubular connection at said end facing said air outlet, and said tubular connection is provided with a screw thread which mates with a screw thread disposed in said the air outlet.

3. An intake air filter according to claim 1, wherein, a tubular connection which carries a first screw thread is arranged on said housing concentric with said first filter insert and extends into the interior of said housing, and wherein a second screw thread arranged on said second filter insert matingly engages the said first screw thread on said housing to secure said second filter insert to said housing.

4. An intake air filter according to claim 3, wherein said tubular connection on said housing is provided with a sealing surface on its outer circumference, and wherein said first filter insert is secured to said tubular connection by means of a gasket disposed on said first filter insert.

5. An intake air filter according to claim 1, wherein said second filter insert comprises at its end facing said air outlet a sealing surface which is provided with a gasket and which abuts a sealing surface on said housing.

6. An intake air filter according to claim 5, wherein said gasket is provided with serrations for securing said second filter insert to said housing.

* * * * *